(12) United States Patent
Ahn et al.

(10) Patent No.: US 12,380,840 B2
(45) Date of Patent: *Aug. 5, 2025

(54) DISPLAY DEVICE AND METHOD OF GENERATING TEMPERATURE PROFILE OF DISPLAY DEVICE

(71) Applicant: SAMSUNG DISPLAY CO., LTD., Yongin-si (KR)

(72) Inventors: Kuk-Hwan Ahn, Yongin-si (KR);
Seungjae Lee, Yongin-si (KR);
Dae-Gwang Jang, Yongin-si (KR);
Seongheon Cho, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/776,839

(22) Filed: Jul. 18, 2024

(65) Prior Publication Data
US 2024/0377967 A1    Nov. 14, 2024

Related U.S. Application Data

(63) Continuation of application No. 18/348,627, filed on Jul. 7, 2023, now Pat. No. 12,073,778.

(30) Foreign Application Priority Data

Nov. 18, 2022    (KR) .................. 10-2022-0155497

(51) Int. Cl.
G09G 3/32    (2016.01)
G06F 3/06    (2006.01)
G06F 12/02   (2006.01)

(52) U.S. Cl.
CPC ............ *G09G 3/32* (2013.01); *G06F 3/0604* (2013.01); *G06F 3/0619* (2013.01); *G06F 3/064* (2013.01);
(Continued)

(58) Field of Classification Search
CPC ............... G09G 3/32; G09G 2310/08; G09G 2320/041; G09G 2330/045
See application file for complete search history.

(56) References Cited

U.S. PATENT DOCUMENTS 9,489,897 B2    11/2016  Jaffari et al.
2018/0286349 A1*  10/2018  Mohammadi ............ G09G 3/20
2024/0169895 A1    5/2024  Ahn et al.

OTHER PUBLICATIONS

Notice of Allowance dated Apr. 29, 2024 in corresponding U.S. Appl. No. 18/348,627.

* cited by examiner

*Primary Examiner* — Jonathan A Boyd
(74) *Attorney, Agent, or Firm* — F. CHAU & ASSOCIATES, LLC

(57) ABSTRACT

A display device includes a display panel including pixels, driving chips applying data voltages to the pixels through channels; and a timing controller determining the data voltages output from the channels by each of the driving chips based on input image data, determining a load ratio of each of the driving chips based on the data voltages, generating a current temperature profile of a first pixel row based on the load ratio of each of the driving chips, generating a current temperature profile of a second pixel row based on the load ratio of each of the driving chips, and generating a two-dimensional temperature profile based on the current temperature profiles of the first pixel row and the second pixel row.

20 Claims, 15 Drawing Sheets

(52) U.S. Cl.
CPC .......... *G06F 3/0659* (2013.01); *G06F 3/0679* (2013.01); *G06F 12/0246* (2013.01); *G09G 2310/08* (2013.01); *G09G 2320/041* (2013.01); *G09G 2330/045* (2013.01)

DISPLAY DEVICE AND METHOD OF GENERATING TEMPERATURE PROFILE OF DISPLAY DEVICE

CROSS REFERENCE TO RELATED APPLICATIONS

This U.S. non-provisional patent application is a continuation application of U.S. patent application Ser. No. 18/348,627 filed Jul. 7, 2023, which claims priority under 35 U.S.C. § 119 to Korean Patent Application No. 10-2022-0155497, filed on Nov. 18, 2022 in the Korean Intellectual Property Office KIPO, the disclosures of which are incorporated by reference in their entirety herein.

1. TECHNICAL FIELD

Embodiments of the present inventive concept relate to a display device and a method of generating a temperature profile of the display device. More particularly, embodiments of the present inventive concept relate to a display device including a driving chips and a method of generating a temperature profile of the display device.

2. DISCUSSION OF RELATED ART

A display device may include a display panel, a timing controller, a gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The timing controller may control the gate driver and the data driver.

The data driver may include a plurality of driving chips. Loads of each of driving chips may vary according to swing levels of output signals. That is, the load varies according to a pattern displayed on the display panel, and accordingly, heat levels of the driving chips may vary.

Heat generated by the driving chips may increase a temperature of the display panel. Also, such a temperature increase may damage the display panel or result in lower quality images.

SUMMARY

At least one embodiment of the present inventive concept provides a display device that predicts and models an effect of a heat generated by driving chips of a data driver of the display device on a temperature of a display panel of the display device.

At least one embodiment of the present inventive concept provides a method of generating a temperature profile of the display device.

According to an embodiment of the present inventive concept, a display device includes a display panel including pixels, a plurality of driving chips configured to apply data voltages to the pixels through channels, and a timing controller configured to determine the data voltages output from the channels by each of the driving chips based on input image data, to determine a load ratio of each of the driving chips based on the data voltages, to generate a current temperature profile of a first pixel row among the pixels based on the load ratio of each of the driving chips, to generate a current temperature profile of a second pixel row among the pixels based on the load ratio of each of the driving chips, to generate a two-dimensional temperature profile based on the current temperature profiles of the first pixel row and the second pixel row.

In an embodiment, the timing controller may be configured to determine the data voltages using a grayscale-voltage lookup table including the data voltages corresponding to grayscale values.

In an embodiment, the timing controller may be configured to determine the data voltages using grayscale-voltage lookup tables for the driving chips including the data voltages corresponding to grayscale values.

In an embodiment, the timing controller may be configured to determine the load ratio of each of the driving chips based on differences in the data voltages between adjacent pixel rows in each of the channels.

In an embodiment, the timing controller may be configured to sum the differences in the data voltages between the adjacent pixel rows in each of the channels to calculate channel loads of the channels, sum the channel loads of each of the driving chips to calculate a chip load of each of the driving chips, and divide the chip load by a maximum chip load to determine the load ratio of each of the driving chips.

In an embodiment, the maximum chip load may be the chip load when a maximum load pattern is displayed on the display panel.

In an embodiment, the maximum load pattern may be a zebra pattern.

In an embodiment, the timing controller may be configured to generate the current temperature profiles of the first pixel row and the second pixel row based on a maximum load temperature profile and a minimum load temperature profile.

In an embodiment, the timing controller may be configured to generate the current temperature profile of the first pixel row based on the maximum load temperature profile of the first pixel row, the minimum load temperature profile of the first measurement pixel row, and the load ratio of each of the driving chips, and the timing controller may be configured to generate the current temperature profile of the second pixel row based on the maximum load temperature profile of the second pixel row, the minimum load temperature profile of the second pixel row, and the load ratio of each of the driving chips.

In an embodiment, the current temperature profile of the first pixel row may be a temperature profile corresponding to the load ratio of each of the driving chips between the maximum load temperature profile of the first measurement pixel row and the minimum load temperature profile of the first measurement pixel row, and the current temperature profile of the second pixel row may be a temperature profile corresponding to the load ratio of each of the driving chips between the maximum load temperature profile of the second pixel row and the minimum load temperature profile of the second pixel row.

In an embodiment, the maximum load temperature profile may be a temperature profile when the driving chips display a maximum load pattern.

In an embodiment, the minimum load temperature profile may be a temperature profile when the driving chips display a minimum load pattern.

In an embodiment, the minimum load pattern may be a monochromatic pattern.

In an embodiment, the timing controller may be configured to generate the two-dimensional temperature profile based on the current temperature profiles of the first measurement pixel row and the second measurement pixel row and a temperature profile of a column of sub-pixels of the display panel.

In an embodiment, the two-dimensional temperature profile may be generated by summing the current temperature profiles of the first pixel row and the second pixel row and the temperature profile of the column of sub-pixels.

In an embodiment, the timing controller may be configured to generate the two-dimensional temperature profile based on the current temperature profiles of the first pixel row and the second pixel row and an average temperature profile of temperature profiles of columns of sub-pixels of the display panel.

In an embodiment, the two-dimensional temperature profile may include a temperature increment from a pixel row adjacent to the driving chips to a predetermined reference pixel row.

In an embodiment, the first measurement pixel row may be a pixel row adjacent to the driving chips.

According to an embodiment, a method of generating a temperature profile of a display device is provided that includes determining data voltages output from channels by each of driving chips based on input image data, determining a load ratio of each of the driving chips based on the data voltages, generating a current temperature profile of a first pixel row of the display device based on the load ratio of each of the driving chips, generating a current temperature profile of a second pixel row of the display device based on the load ratio of each of the driving chips, and generate a two-dimensional temperature profile based on the current temperature profiles of the first pixel row and the second pixel row.

In an embodiment, the current temperature profiles of the first pixel row and the second pixel row may be generated based on a maximum load temperature profile and a minimum load temperature profile.

According to an embodiment of the present inventive concept, a display device includes a display panel including pixels, a plurality of driving chips, and a timing controller. The timing controller is configured to determine data voltages output by each of the driving chips, to determine a load ratio of each of the driving chips based on the data voltages, to generate a current temperature profile of a first pixel row of the pixels based on the load ratio of each of the driving chips, to generate a current temperature profile of a second pixel row of the pixels based on the load ratio of each of the driving chips, to determine a temperature of at least one pixel among the pixels based on the current temperature profiles of the first pixel row and the second pixel row, and adjust the data voltages for the at least one pixels based on the temperature. The adjust may reduce a level of the data voltages for the at least one pixel when the temperature exceeds a threshold.

A display device of at least one of the embodiments may predict and model an effect of heat generated by the driving chips on a temperature of a display panel by determining data voltages output from channels of each of the driving chips based on input image data, determining a load ratio of each of the driving chips based on the data voltages, generating a current temperature profile of a first pixel row based on a load ratio of each of the driving chips, generating a current temperature profile of a second pixel row based on the load ratio of each of the driving chips, generating a two-dimensional temperature profile based on the current temperature profiles of the first measurement pixel row and the second measurement pixel row.

In an embodiment, the display device may compensate for local image degradation and enhance display quality using the modeled temperature profile.

However, the effects of the present inventive concept are not limited to the above-described effects, and may be variously expanded without departing from the spirit and scope of the present inventive concept.

DETAILED DESCRIPTION OF THE INVENTIVE CONCEPT

Hereinafter, the present inventive concept will be explained in detail with reference to the accompanying drawings.

Figure 1:
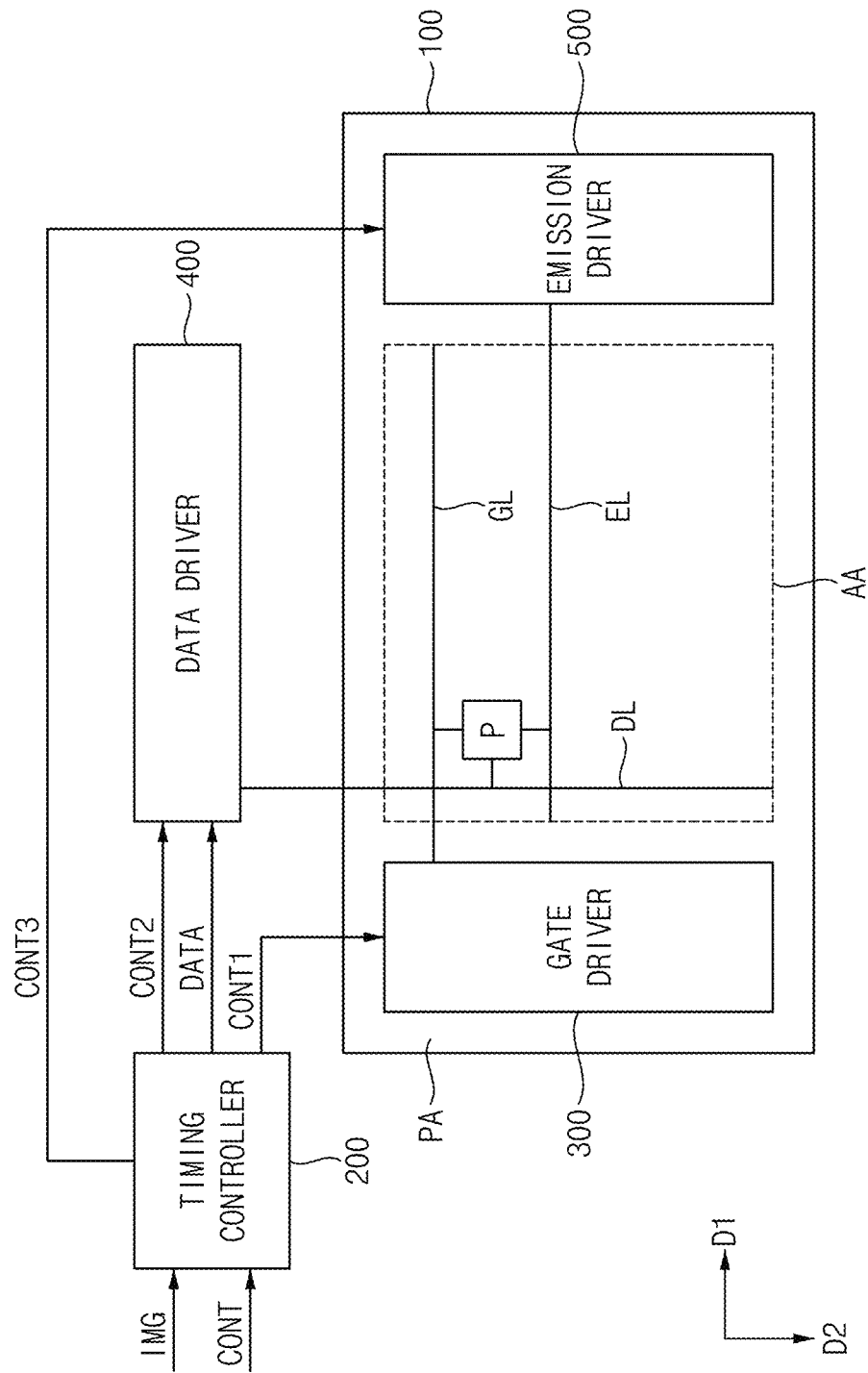
FIG. 1 is a block diagram illustrating a display device according to an embodiment of the present inventive concept.

FIG. 1 is a block diagram illustrating a display device according to an embodiment of the present inventive concept.

Referring to FIG. 1, the display device may include a display panel 100, a timing controller 200 (e.g., a control circuit), a gate driver 300 (e.g., a driver circuit), a data driver 400 (e.g., a driver circuit), and a emission driver 500 (e.g., a driver circuit). In an embodiment, the timing controller 200 and the data driver 400 may be integrated into one chip.

The display panel 100 has a display region AA on which an image is displayed and a peripheral region PA adjacent to the display region AA. In an embodiment, the gate driver 300 may be mounted on the peripheral region PA of the display panel 100.

The display panel 100 may include a plurality of gate lines GL, a plurality of data lines DL, a plurality of emission lines EL, and a plurality of pixels P electrically connected to the data lines DL, the gate lines GL, and the emission lines EL. The gate lines GL may extend in a first direction D1 and the data lines DL and the emission lines EL may extend in a second direction D2 crossing the first direction D1.

The timing controller 200 may receive input image data IMG and an input control signal CONT from a host processor (e.g., a graphic processing unit; GPU). For example, the input image data IMG may include red image data, green image data and blue image data. In an embodiment, the input image data IMG may further include white image data. For another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, a third control signal CONT3, and data signal DATA based on the input image data IMG and the input control signal CONT.

The timing controller 200 may generate the first control signal CONT1 for controlling an operation of the gate driver 300 based on the input control signal CONT and output the first control signal CONT1 to the gate driver 300. The first control signal CONT1 may include a vertical start signal and a gate clock signal.

The timing controller 200 may generate the second control signal CONT2 for controlling an operation of the data driver 400 based on the input control signal CONT and output the second control signal CONT2 to the data driver 400. The second control signal CONT2 may include a horizontal start signal and a load signal.

The timing controller 200 may receive the input image data IMG and the input control signal CONT, and generate the data signal DATA. The timing controller 200 may output the data signal DATA to the data driver 400.

The timing controller 200 may generate the third control signal CONT3 for controlling operation of the emission driver 500 based on the input control signal CONT and output the third control signal CONT3 to the emission driver 500. The third control signal CONT3 may include a vertical start signal and a emission clock signal.

The gate driver 300 may generate gate signals for driving the gate lines GL in response to the first control signal CONT1 input from the timing controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may convert the data signal DATA into data voltages having an analog type. The data driver 400 may output the data voltages to the data lines DL.

The emission driver 500 may generate emission signals for driving the emission lines EL in response to the third control signal CONT3 input from the timing controller 200. The emission driver 500 may output the emission signals to the emission lines EL. For example, the emission driver 500 may sequentially output the emission signals to the emission lines EL.

Figure 2:
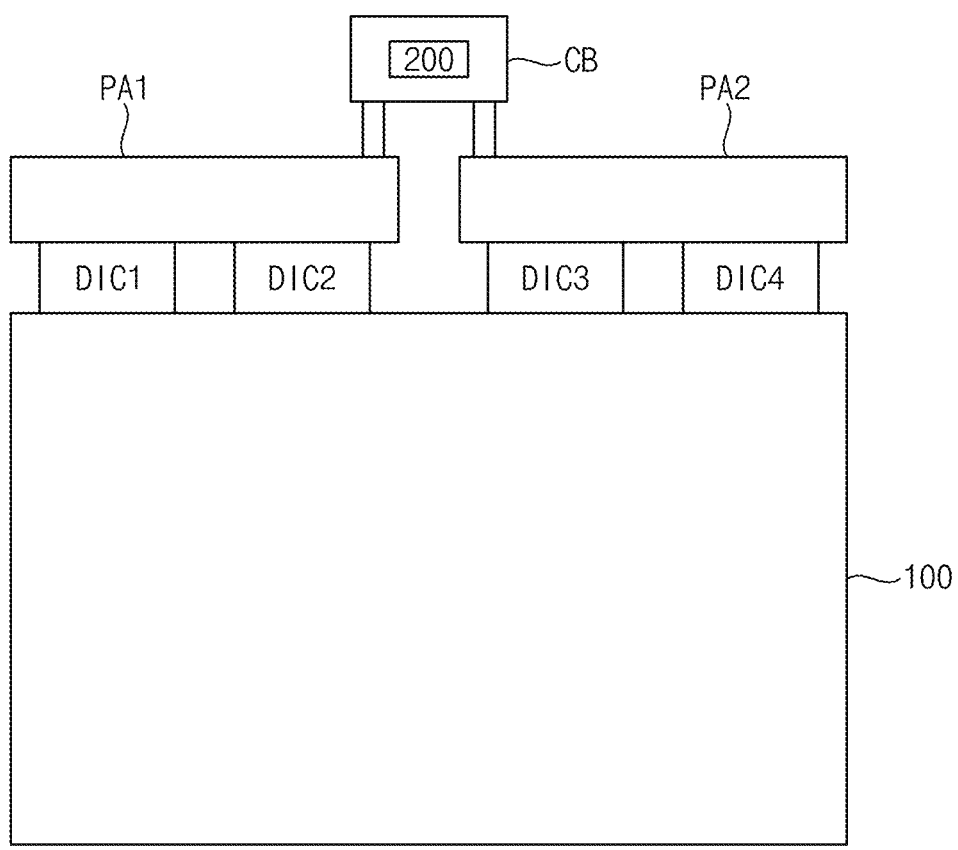
FIG. 2 is a conceptual diagram illustrating the display device of FIG. 1.

FIG. 2 is a conceptual diagram illustrating the display device of FIG. 1.

Referring to FIGS. 1 and 2, the data driver 400 may be implemented with a plurality of driving chips DIC1, DIC2, DIC3, and DIC4. In FIG. 2, the display device is illustrated as including four driving chips DIC1, DIC2, DIC3, and DIC4, but the present inventive concept is not limited to this number of the driving chips DIC1, DIC2, DIC3, and DIC4.

The display device may include printed circuit boards PA1 and PA2 connected to the driving chips DIC1, DIC2, DIC3, and DIC4 and a control board CB connected to the printed circuit boards PA1 and PA2 and on which the timing controller 200 is disposed. In an embodiment, the timing controller 200 may be integrated into the driving chips DIC1, DIC2, DIC3, and DIC4.

For example, the display device may include the control board CB, and the first printed circuit board PA1 and the second printed circuit board PA2 connected to the control board CB. The first and second driving chips DIC1 and DIC2 may be connected between the first printed circuit board PA1 and the display panel 100. For example, the first and second driving chips DIC1 and DIC2 may be connected to the first printed circuit board PA1 and to the display panel 100. The third and fourth driving chips DIC3 and DIC4 may be connected between the second printed circuit board PA2 and the display panel 100. For example, the third and fourth driving chips DIC3 and DIC4 may be connected to the second printed circuit board PA2 and the display panel 100. However, the present inventive concept is not limited to the arrangement of FIG. 2.

Figure 3:
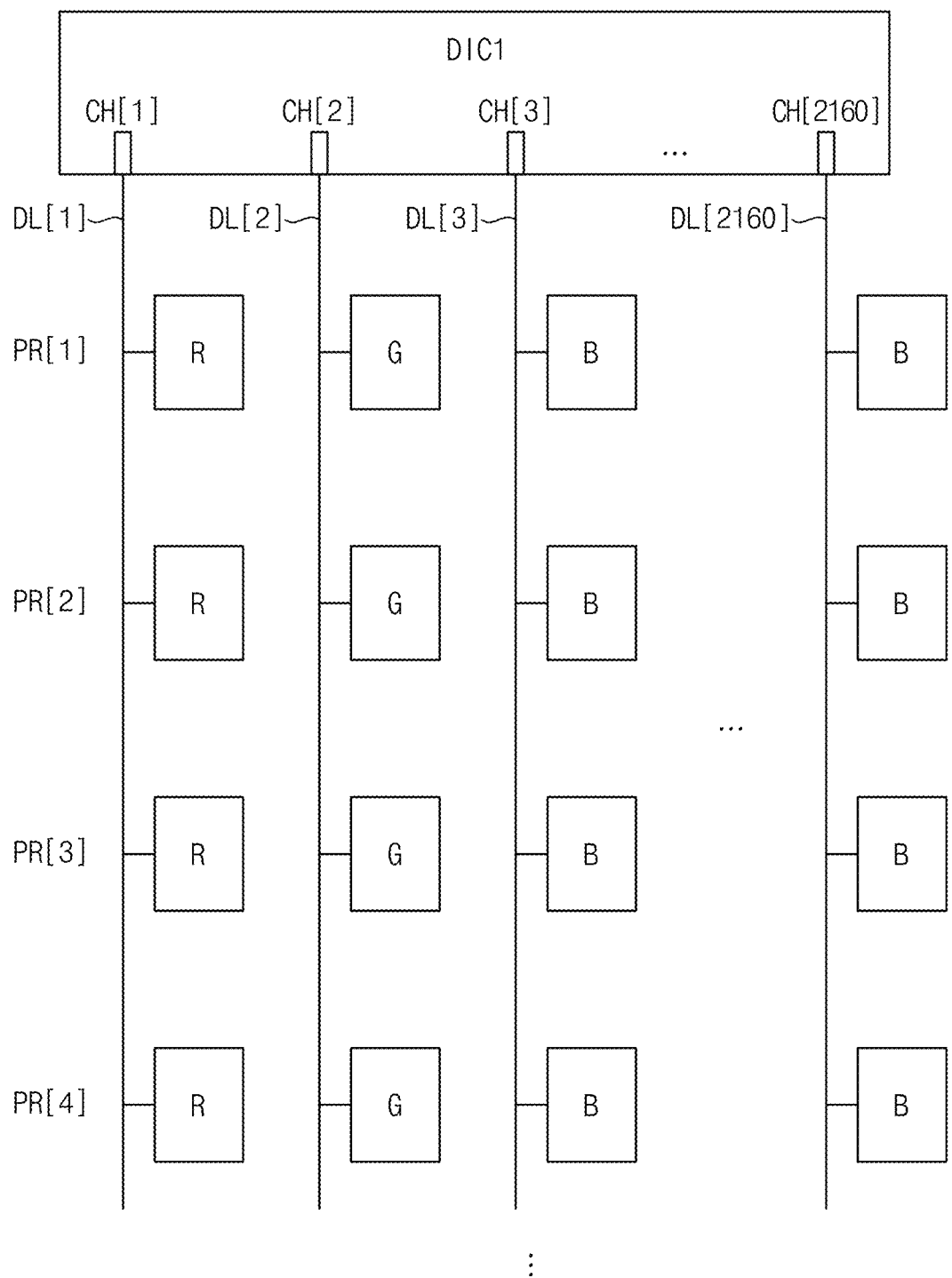
FIG. 3 is a diagram illustrating an example in which a first driving chip of FIG. 2 is connected to sub-pixels R, G, and B.
Figure 4:
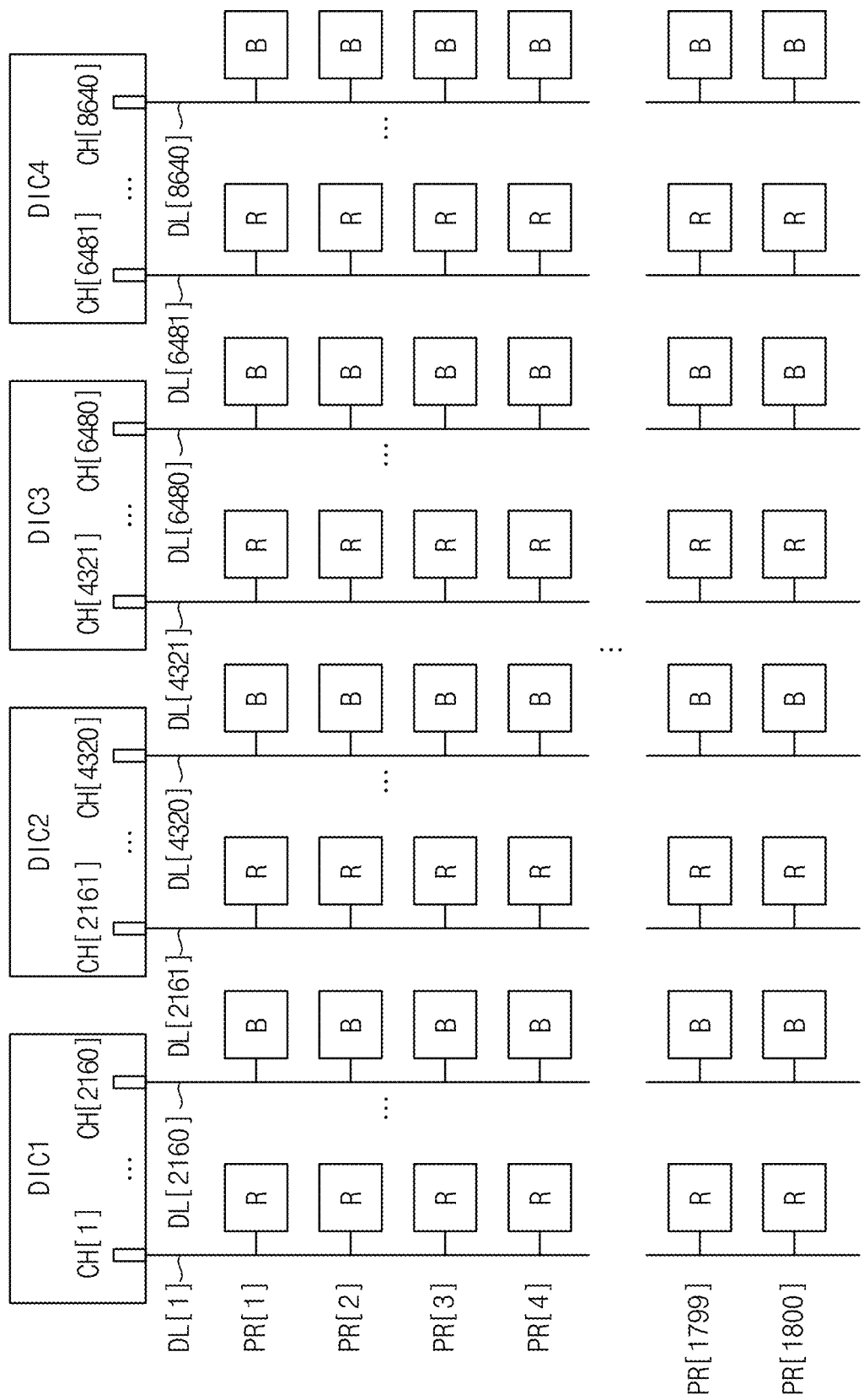
FIG. 4 is a diagram illustrating an example in which the driving chips of FIG. 2 are connected to sub-pixels.

FIG. 3 is a diagram illustrating an example in which the first driving chip DIC1 of FIG. 2 is connected to sub-pixels R, G, and B, and FIG. 4 is a diagram illustrating an example in which the driving chips DIC1, DIC2, DIC3, and DIC4 of FIG. 2 are connected to the sub-pixels R, G, and B.

Referring to FIGS. 1 to 3, each of the pixels P may include a first color sub-pixel R displaying a first color, a second color sub-pixel G displaying a second color, and a third color sub-pixel displaying a third color B. For example, the first color may be red, the second color may be green, and the third color may be blue. In FIG. 3, it is exemplified that each of the pixels P have an RGB stripe structure, the present inventive concept is not limited to the structure of each of the pixels P.

The driving chips DIC1, DIC2, DIC3, and DIC4 may apply the data voltages to the pixels P (i.e., the sub-pixels R, G, and B) through channels.

For example, the first driving chip DIC1 may include the 1st to 2160th channels (CH[1], CH[2], . . . , CH[2160]). The 1st to 2160th channels (CH[1], CH[2], . . . , CH[2160]) may be connected to the 1st to 2160th data lines (DL[1], DL[2], . . . , DL[2160]). The first driving chip DIC1 may apply the data voltages to the 1st to 2160th data lines (DL[1], DL[2], . . . , DL[2160]) through the 1st to 2160th channels (CH[1], CH[2], . . . , CH[2160]).

Referring to FIGS. 3 and 4, the second to fourth driving chips DIC2, DIC3, and DIC4 may be connected to the sub-pixels R, G, and B in substantially the same manner as the first driving chip DIC1.

In FIG. 3, the first driving chip DIC1 is illustrated as connected to the 2160 data lines (DL[1], DL[2], . . . , DL[2160]) through the 2160 channels (CH[1], CH[2], . . . , CH[2160]), but the present inventive concept is not limited to this number of channels and data lines DL. This is the same for the second to fourth driving chips DIC2, DIC3, and DIC4.

Referring to FIGS. 1, 2, and 4, each of the pixels P may include one first color sub-pixel R, one second color sub-pixel G, and one third color sub-pixel B. However, the present inventive concept is not limited to the structure of the pixel P.

When a resolution of the display panel 100 is 2880×1800, the display panel 100 may include 1800 pixel rows (PR[1], PR[2], . . . , PR[1800]) and 2880 pixel columns. As shown in FIG. 3, when one pixel P includes three subpixels R, G, and B, one pixel column may include three subpixel columns. That is, the display panel 100 may include 8640 (2880×3=8640) subpixel columns.

For example, the gate driver 300 may simultaneously scan one pixel row (PR[1], PR[2], . . . , PR[1800]). For example, one sub-pixel column may be connected to one data line (DL[1], . . . , DL[8640]).

For example, each of the driving chips DIC1, DIC2, DIC3, and DIC4 may be connected to the same number of sub-pixel columns. For example, the first driving chip DIC1 may be connected to the 1st to 2160th data lines (DL[1], . . . , DL[2160]). For example, the second driving chip DIC2 may be connected to the 2161st to 4320th data lines (DL[2161], . . . , DL[4320]). For example, the third driving chip DIC3 may be connected to the 4321st to 6480th data lines (DL[4321], . . . , DL[6480]). For example, the fourth driving chip DIC4 may be connected to the 6481st to 8640th data lines (DL[6481], . . . , DL[8640]).

In this embodiment, the resolution of the display panel 100 is exemplified as 2880×1800, but the present inventive concept is not limited thereto.

Figure 5:
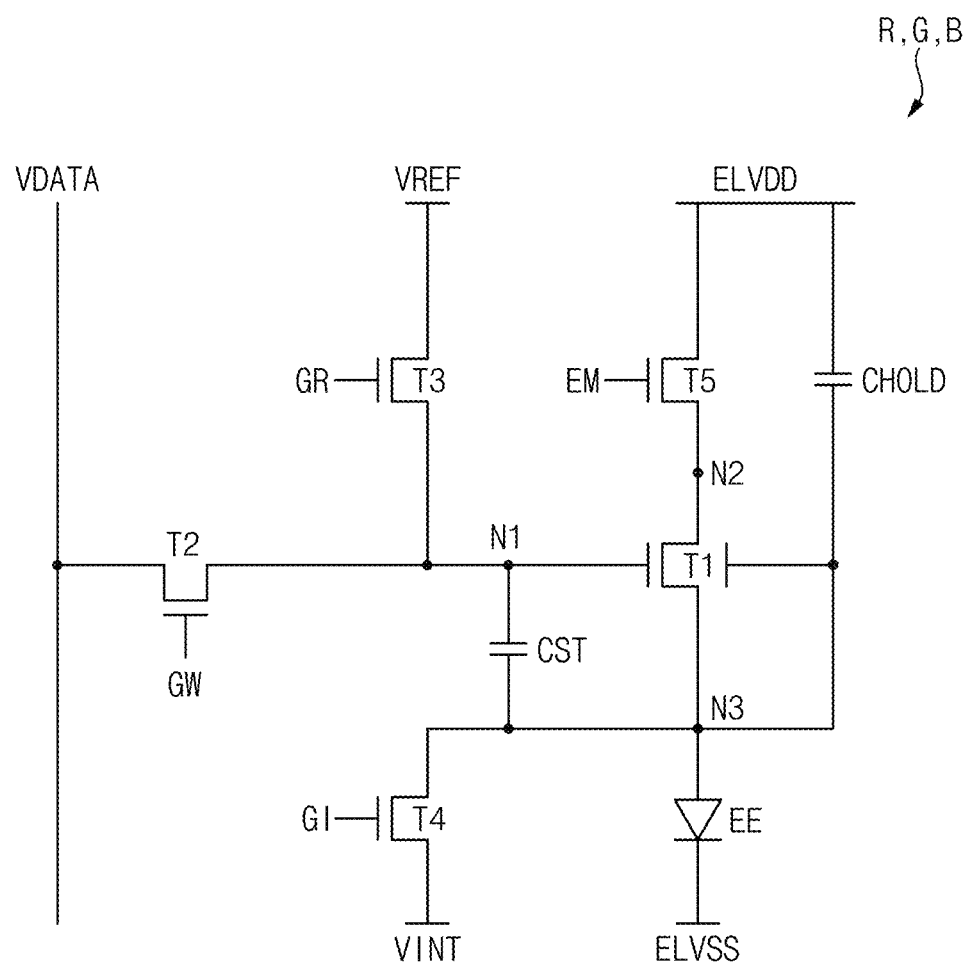
FIG. 5 is a circuit diagram illustrating an example of sub-pixels of FIG. 4.

FIG. 5 is a circuit diagram illustrating an example of the sub-pixels of FIG. 4.

Referring to FIG. 5, each of the sub-pixels R, G, and B may include a first transistor T1 including a control electrode connected to a first node N1, a first electrode connected to a second node N2, and a second electrode connected to a third node N3, a second transistor T2 including a control electrode receiving a write gate signal GW, a first electrode receiving the data voltage VDATA, and a second electrode connected to the first node N1, a third transistor T3 including a control electrode receiving a reference gate signal GR, a first electrode receiving a reference voltage VREF, and a second electrode connected to the first node N1, a fourth transistor T4 including a control electrode receiving an initialization gate signal GI, a first electrode receiving a initialization voltage VINT, and a second electrode connected to the third node N3, a fifth transistor T5 including a control electrode receiving the emission signal EM, a first electrode receiving a first power voltage ELVDD, and a second electrode connected to the second node N2, a storage capacitor CST including a first electrode connected to the first node N1 and a second electrode connected to the third node N3, a hold capacitor CHOLD including a first electrode receiving the first power voltage ELVDD and a second electrode connected to the third node N3, and a light emitting element EE including a first electrode connected to the third node N3 and a second electrode receiving a second power voltage ELVSS.

The light emitting element EE included in the first color sub-pixels R may emit light in the first color, the light emitting element EE included in the second color sub-pixels G may emit light in the second color, and the light emitting element EE included in the third color sub-pixels B may emit light in the third color. For example, the light emitting element EE could be implemented by a light emitting diode.

In this embodiment, each of the pixels P is illustrated as having a 5T2C structure including 5 transistors and 2 capacitors, but the present inventive concept is not limited to the structure of the pixels P.

The first to fifth transistors T1, T2, T3, T4, and T5 may be implemented as n-channel metal oxide semiconductor (NMOS) transistors. For example, the first to fifth transistors T1, T2, T3, T4, and T5 may be oxide transistors.

In this embodiment, it is exemplified that each of the pixels P is implemented with the NMOS transistors, but the present inventive concept is not limited to the type of transistors.

Figure 6:
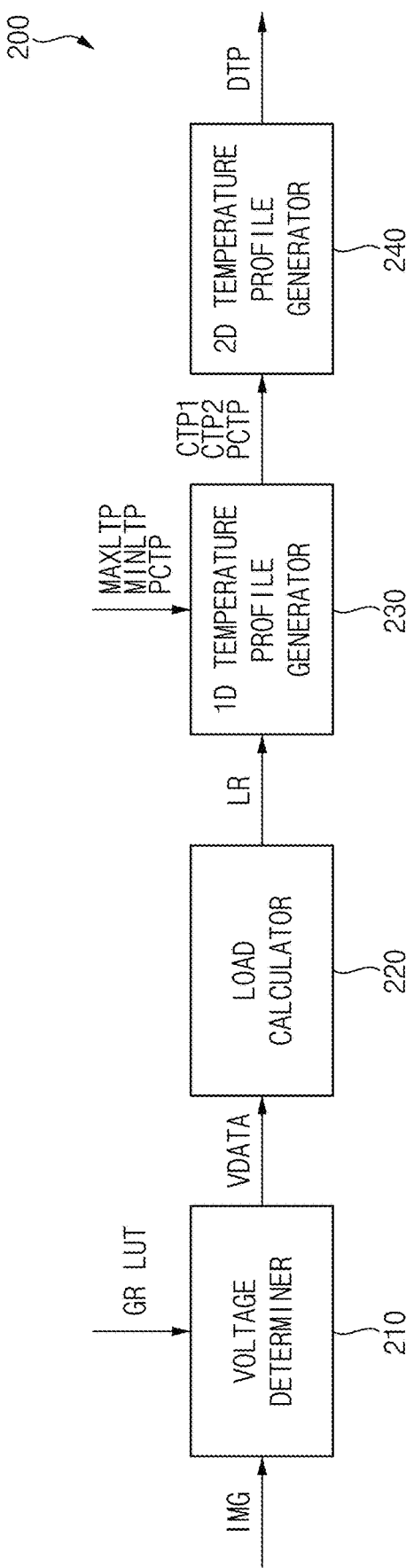
FIG. 6 is a block diagram illustrating an example of a timing controller of the display device of FIG. 1.
Figure 7:
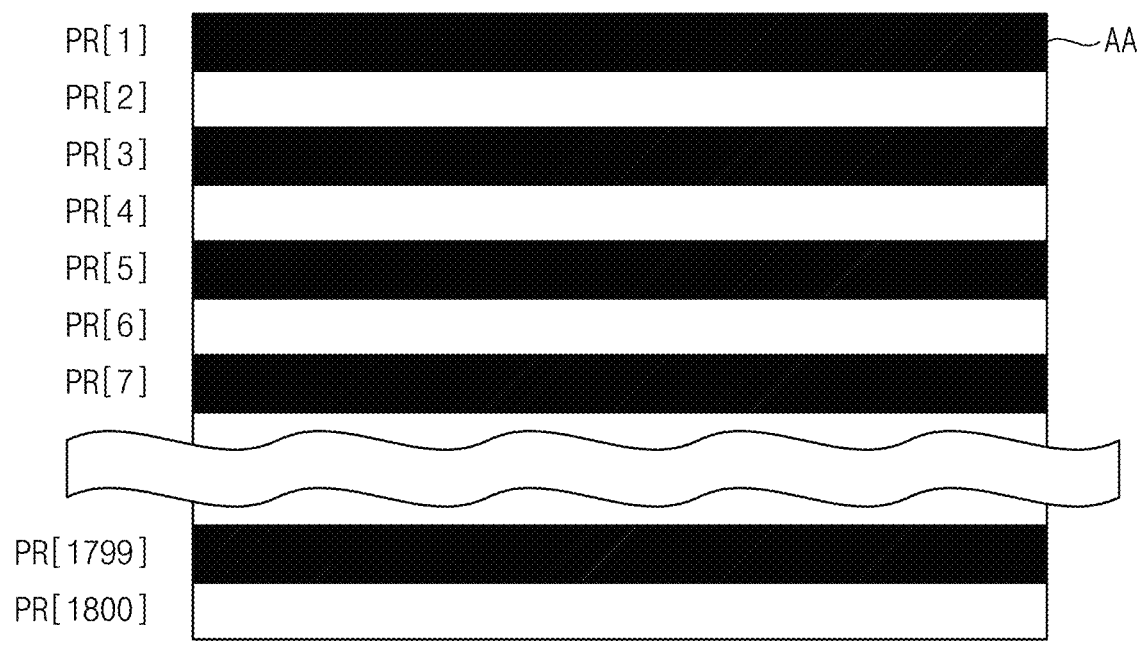
FIGS. 7 and 8 are diagrams for explaining a maximum chip load.
Figure 8:
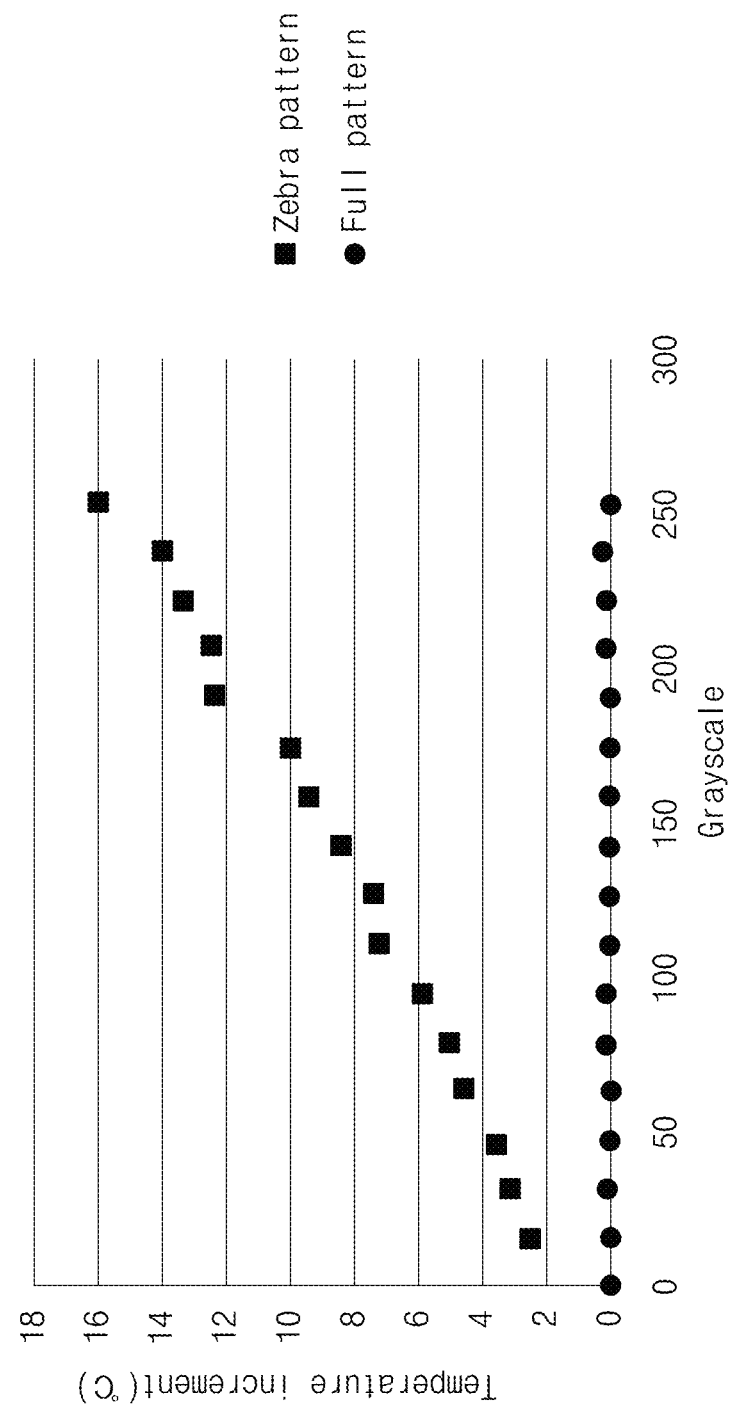

FIG. 6 is a block diagram illustrating an example of the timing controller 200 of the display device of FIG. 1, and FIGS. 7 and 8 are diagrams for explaining a maximum chip load.

Referring to FIGS. 1, 4, and 6, the timing controller 200 may determine the data voltages VDATA output from the channels (CH[1], . . . , CH[8640]) of each of the driving chips DIC1, DIC2, DIC3, and DIC4 based on the input image data IMG, determine a load ratio LR of each of the driving chips DIC1, DIC2, DIC3, and DIC4 based on the data voltages VDATA, generate a current temperature profile CTP1 of a first measurement pixel row based on the load ratio LR of each of the driving chips DIC1, DIC2, DIC3, and DIC4, generate a current temperature profile CTP2 of a second measurement pixel row based on the load ratio LR of each of the driving chips DIC1, DIC2, DIC3, and DIC4, and generate a two-dimensional temperature profile DTP based on the current temperature profiles CTP1 and CTP2 of the first measurement pixel row and the second measurement pixel row.

The timing controller 200 may include a voltage determiner 210 (e.g., a first logic circuit), a load calculator 220 (e.g., a second logic circuit), a one-dimensional temperature profile generator 230 (e.g., a third logic circuit), and a two-dimensional temperature profile generator 240 (e.g., a fourth logic circuit).

Referring to FIGS. 1, 4, and 6 to 8, the voltage determiner 210 may determine the data voltages VDATA output from each of the channels (CH[1], . . . , CH[8640]) by each of the driving chips DIC1, DIC2, DIC3, and DIC4 based on the input image data IMG. That is, the voltage determiner 210 may determine output voltages (i.e., the data voltages VDATA) output by the driving chips DIC1, DIC2, DIC3, and DIC4 based on the input image data IMG. For example, the voltage determiner 210 may calculate the output voltages of the driving chips DIC1, DIC2, DIC3, and DIC4 through a pre-stored look-up table.

In an embodiment, the voltage determiner 210 may determine the data voltages VDATA using a grayscale-voltage lookup table GR LUT including the data voltages VDATA corresponding to grayscale values. The grayscale-voltage lookup table GR LUT may store voltage values of the data voltages VDATA output to display each grayscale value. Accordingly, the voltage determiner 210 may calculate the data voltages VDATA from the grayscale values of the input image data IMG.

In another embodiment, the voltage determiner 210 may determine the data voltages using grayscale-voltage lookup tables GR LUT for the driving chips DIC1, DIC2, DIC3, and DIC4 including the data voltages VDATA corresponding to the grayscale values. Since the data voltages VDATA output to display the same grayscale value may be different for each driving chip DIC1, DIC2, DIC3, and DIC4, a different grayscale-voltage lookup table GR LUT may be used for each driving chip DIC1, DIC2, DIC3, and DIC4.

The load calculator 220 may determine the load ratio LR of each of the driving chips DIC1, DIC2, DIC3, and DIC4 based on the data voltages VDATA. The load calculator 220 may determine the load ratio LR of each of the driving chips DIC1, DIC2, DIC3, and DIC4 based on differences in data voltages VDATA between adjacent pixel rows (PR[1], PR[2], . . . , PR[1800]) in each of the channels (CH[1], . . . , CH[8640]).

In an embodiment, the load calculator 220 sums the differences in the data voltages VDATA between the adjacent pixel rows (PR[1], PR[2], . . . , PR[1800]) in each of the channels (CH[1], . . . , CH[8640]) to calculate channel loads of the channels (CH[1], . . . , CH[8640]), sums the channel loads of each of the driving chips DIC1, DIC2, DIC3, and DIC4 to calculate a chip load of each of the driving chips DIC1, DIC2, DIC3, and DIC4, and divides the chip load by a maximum chip load to determine the load ratio LR of each of the driving chips DIC1, DIC2, DIC3, and DIC4.

For example, the load ratio LR of the first driving chip DIC1 may be calculated below.

The channel loads of each the channels (CH[1], . . . , CH[2160]) of the first driving chip DIC1 may be calculated using [Equation 1].

$$\text{Load\_Sum} = \sum_{N=1}^{1799} |V(N) - V(N+1)| \qquad \text{[Equation 1]}$$

Here, Load_Sum is the sum of differences in the data voltages VDATA between the adjacent pixel rows (PR[1], PR[2], . . . , PR[1800]) in the channels (CH[1], . . . , CH[2160]) of the first driving chip DIC1, V(N) is the data voltage of a Nth pixel row, and V(N+1) is the data voltage of a N+1th pixel row. Since the number of channels (CH[1], . . . , CH[2160]) of the first driving chip DIC1 is 2160, 2160 channel loads may be calculated.

The chip load of the first driving chip DIC1 may be calculated using [Equation 2].

$$\text{Load\_Total} = \sum_{M=1}^{2160} \text{Load\_Sum}(CH[M]) \qquad \text{[Equation 2]}$$

Here, Load_Total is the chip load of the first driving chip DIC1, and Load_Sum (CH[M]) is the sum of differences in the data voltages VDATA between the adjacent pixel rows in a Mth channel.

The load ratio LR of the first driving chip DIC1 may be calculated using [Equation 3].

$$\text{Load\_Ratio} = \frac{\text{Load\_Total}}{\text{Load\_MAX}} \times 100 \qquad \text{[Equation 3]}$$

Here, Load_Ratio is the load ratio LR of the first driving chip DIC1, Load_Total is the chip load of the first driving chip DIC1, and Load_MAX is the maximum chip load.

The display device according to the present embodiment is substantially the same as the display device of FIG. 1 except for compensating for the input image data IMG after the initial driving. Thus, the same reference numerals are used to refer to the same or similar element, and any repetitive explanation will be omitted.

The load ratios LR of the second to fourth driving chips DIC2, DIC3, and DIC4 is calculated in substantially the same way. Thus, any repetitive explanation will be omitted.

The maximum chip load may be a chip load when a maximum load pattern is displayed on the display panel 100. For example, the maximum load pattern may be a zebra pattern. The zebra pattern may be a pattern in which black and non-black colors are alternately arranged. For example, the zebra pattern may include alternating black and non-black stripes.

The load of each of the driving chips DIC1, DIC2, DIC3, and DIC4 may vary according to a swing level of an output signal. That is, the load of each of the driving chips DIC1, DIC2, DIC3, and DIC4 may increase as the change in the output signal increases.

A x-axis of FIG. 8 represents a grayscale value of a color other than the black in the zebra pattern, and a y-axis of FIG. 8 represents a temperature increment of the driving chips DIC1, DIC2, DIC3, and DIC4, and the unit of the temperature increment is Celsius ° C.

As shown in FIG. 8, the temperature increment of the zebra pattern may be larger than that of a full pattern (i.e., a monochromatic pattern), and the temperature increment of the zebra pattern may be larger as the grayscale value of the color other than the black increases.

For example, as shown in FIG. 7, when each of the driving chips DIC1, DIC2, DIC3, and DIC4 alternately output a minimum luminance (e.g., the black) and a maximum luminance (e.g., a white) to the pixel rows (PR[1], PR[2], . . . , PR[1800]), the chip load of each of the driving chips DIC1, DIC2, DIC3, and DIC4 may be maximum.

Figure 9:
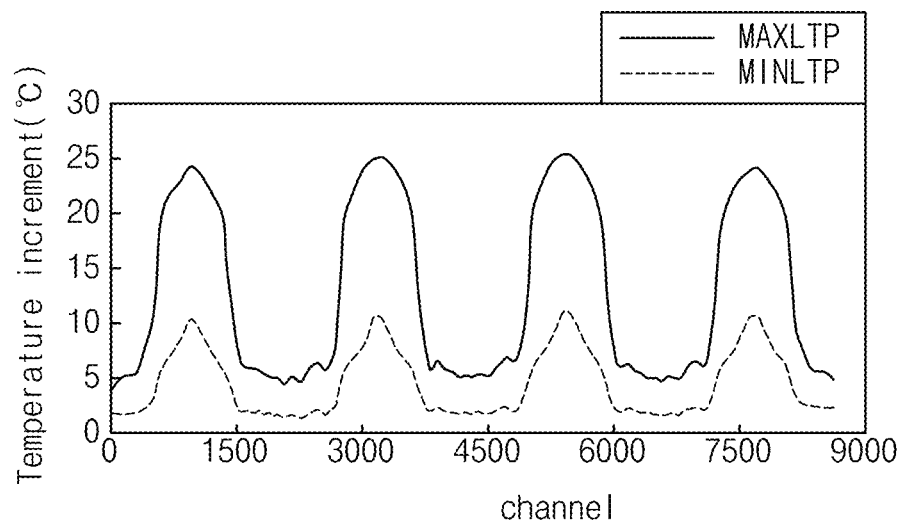
FIG. 9 is a graph illustrating an example of a maximum load temperature profile and a minimum load temperature profile of a first measurement pixel row of FIG. 6.
Figure 10:
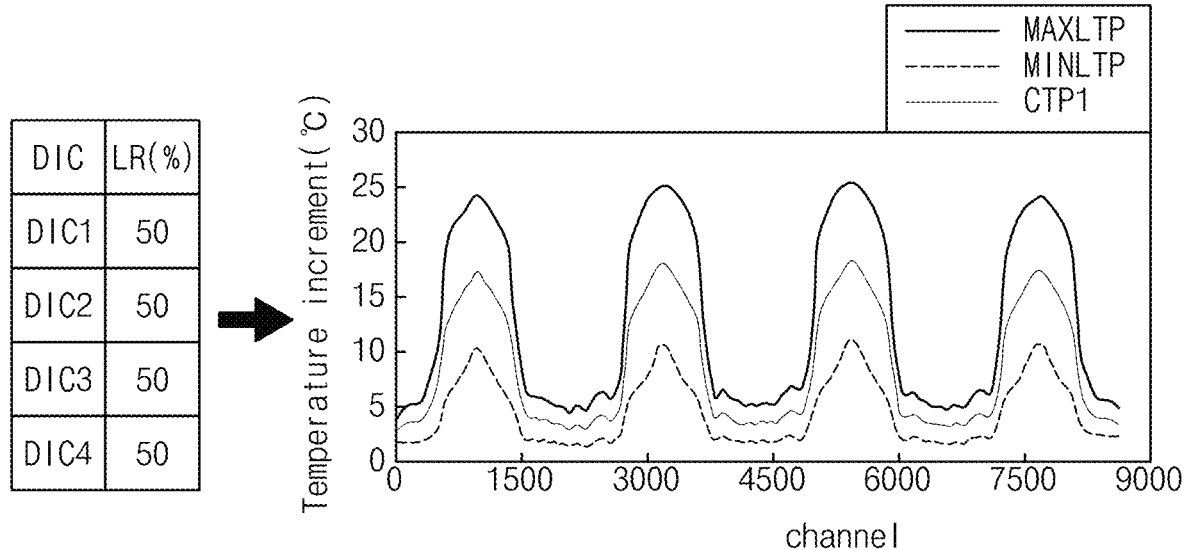
FIGS. 10 and 11 are diagrams illustrating an example in which the display device of FIG. 1 generates a current temperature profile of a first measurement pixel row.
Figure 11:
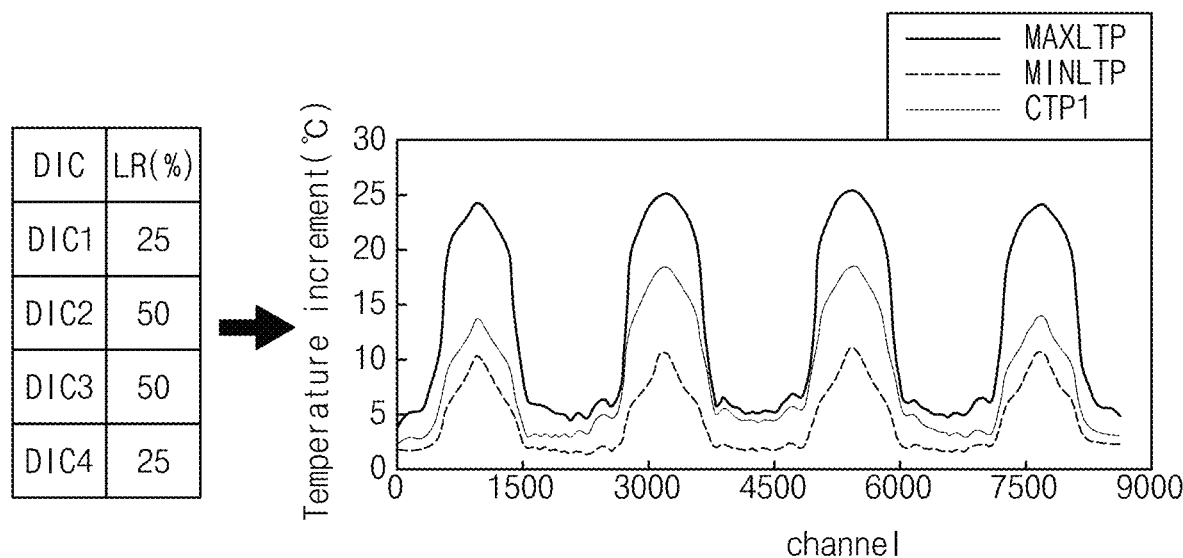
Figure 12:
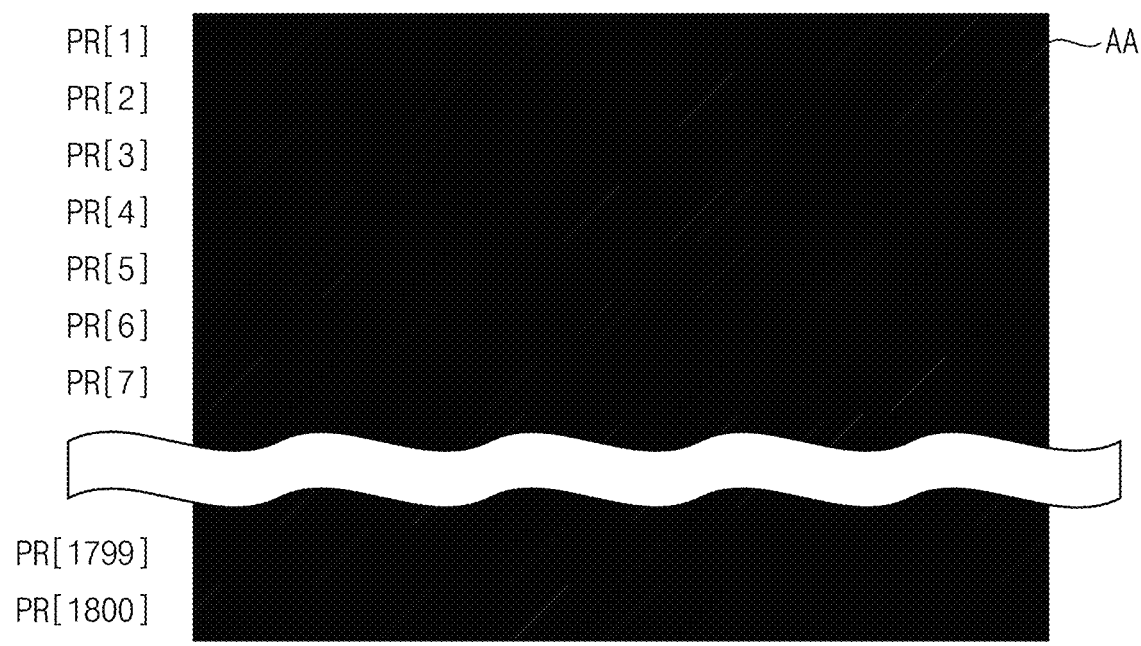
FIG. 12 is a diagram for explaining a minimum load pattern.
Figure 13:
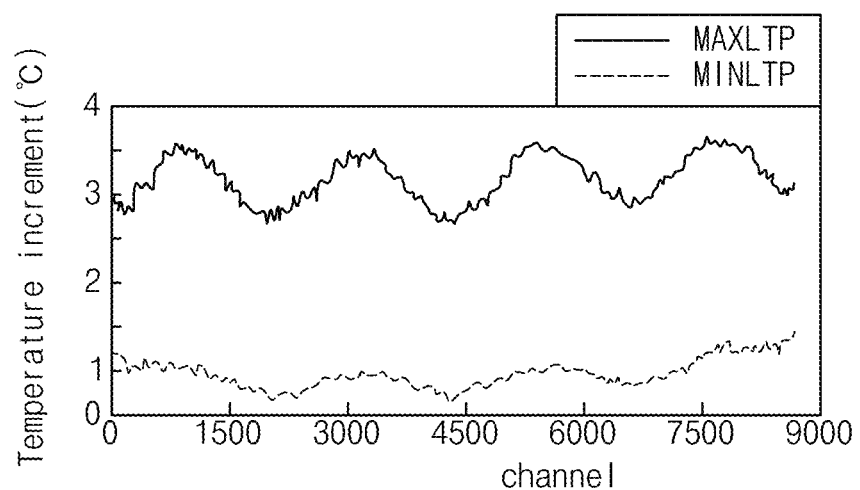
FIG. 13 is a graph illustrating an example of a maximum load temperature profile and a minimum load temperature profile of a second measurement pixel row of FIG. 6.
Figure 14:
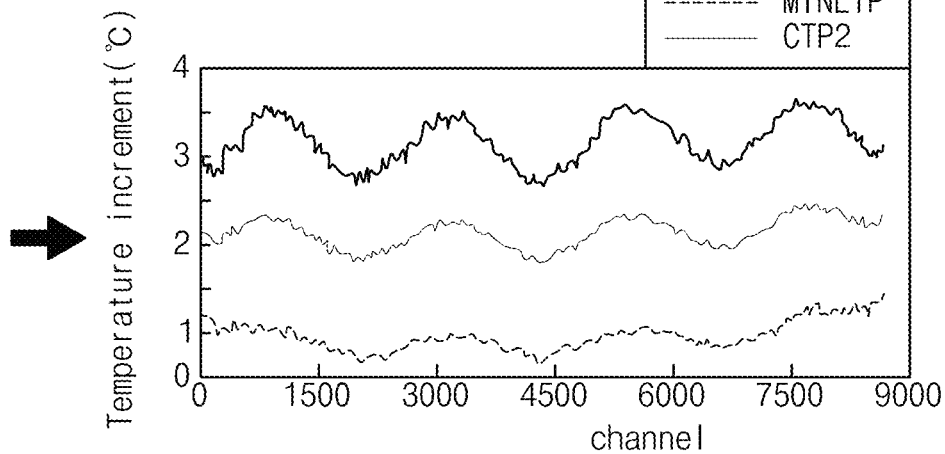
FIGS. 14 and 15 are diagrams illustrating an example in which the display device of FIG. 1 generates a current temperature profile of a second measurement pixel row.
Figure 15:
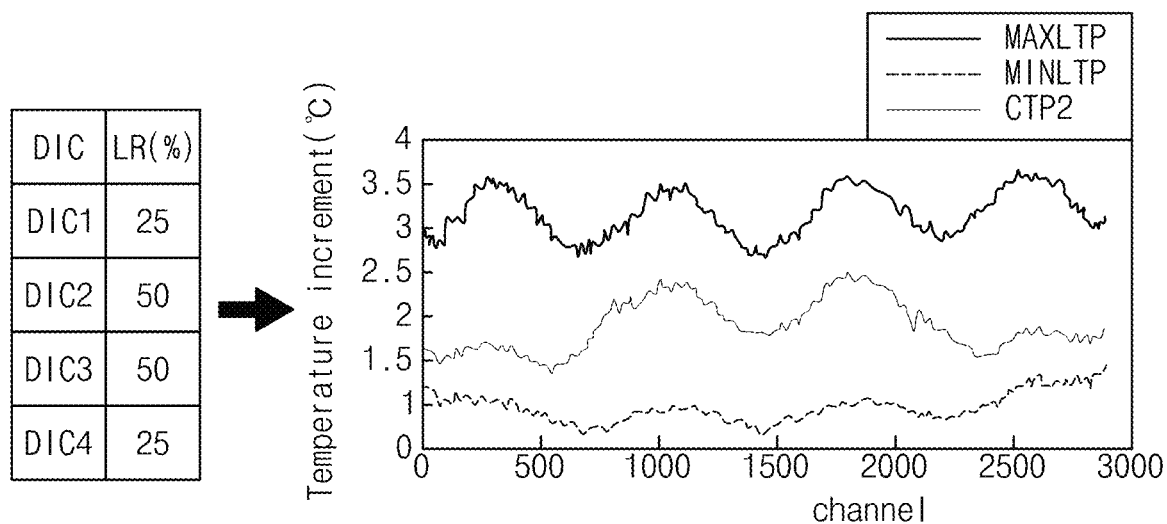

FIG. 9 is a graph illustrating an example of a maximum load temperature profile MAXLTP and a minimum load temperature profile MINLTP of the first measurement pixel row of FIG. 6, FIGS. 10 and 11 are diagrams illustrating an example in which the display device of FIG. 1 generates the current temperature profile CTP1 of the first measurement pixel row, FIG. 12 is a diagram for explaining the minimum load pattern, FIG. 13 is a graph illustrating an example of a maximum load temperature profile MAXLTP and a minimum load temperature profile MINLTP of the second measurement pixel row of FIG. 6, and FIGS. 14 and 15 are diagrams illustrating an example in which the display device of FIG. 1 generates the current temperature profile CTP2 of the second measurement pixel row.

FIGS. 9 to 11 and 13 to 15, a x-axis represents the channels (CH[1], . . . , CH[8640]), and a y-axis represents the temperature increment, and the unit of temperature increment is Celsius ° C.

Referring to FIGS. 4, 6, and 9 to 13, the one-dimensional temperature profile generator 230 may generate the current temperature profiles CTP1 and CTP2 of the first measurement pixel row and the second measurement pixel row based on the maximum load temperature profile MAXLTP and the minimum load temperature profile MINLTP.

The maximum load temperature profile MAXLTP and the minimum load temperature profile MINLTP may be stored in a non-volatile memory device in a form of a lookup table. For example, each lookup table may include an entry for each channel that indicates a corresponding temperature increment. The one-dimensional temperature profile generator 230 may receive the maximum load temperature profile MAXLTP and the minimum load temperature profile MINLTP stored in the form of the lookup table.

The maximum load temperature profile MAXLTP may be a temperature profile when the driving chips DIC1, DIC2, DIC3, and DIC4 display the maximum load pattern. That is, the maximum load temperature profile MAXLTP may represent a temperature increment when the driving chips DIC1, DIC2, DIC3, and DIC4 display the maximum load pattern. For example, the maximum load temperature profile MAXLTP of the first measurement pixel row may represent the temperature increment at the first measurement pixel row when the driving chips DIC1, DIC2, DIC3, and DIC4 display the maximum load pattern. For example, the maximum load temperature profile MAXLTP of the second measurement pixel row may represent the temperature increment at the second measurement pixel row when the driving chips DIC1, DIC2, DIC3, and DIC4 display the maximum load pattern.

The minimum load temperature profile MINLTP may be a temperature profile when the driving chips DIC1, DIC2, DIC3, and DIC4 display the minimum load pattern. The minimum load temperature profile MINLTP may represent a temperature increment when the driving chips DIC1, DIC2, DIC3, and DIC4 display the minimum load pattern. For example, the minimum load temperature profile MINLTP of the first measurement pixel row may represent the temperature increment at the first measurement pixel row when the driving chips DIC1, DIC2, DIC3, and DIC4 display the minimum load pattern. For example, the minimum load temperature profile MINLTP of the second measurement pixel row may represent the temperature increment at the second measurement pixel row when the driving chips DIC1, DIC2, DIC3, and DIC4 display the minimum load pattern.

As shown in FIG. 12, the minimum load pattern may be the monochromatic pattern. As described above, a load of each of the driving chips DIC1, DIC2 DIC3 and DIC4 may vary according to a swing level of an output signal. That is, the load of each of the driving chips DIC1 DIC2 DIC3, and DIC4 may increase as the change in the output signal increases. As shown in FIG. 8, in an embodiment, the temperature increment for the monochromatic pattern is constant regardless of the grayscale value. Accordingly, the minimum load pattern may be the monochromatic pattern regardless of the grayscale value.

In an embodiment, the one-dimensional temperature profile generator 230 generates the current temperature profile CTP1 of the first measurement pixel row based on the maximum load temperature profile MAXLTP of the first measurement pixel row, the minimum load temperature profile MINLTP of the first measurement pixel row, and the load ratio LR of each of the driving chips DIC1, DIC2, DIC3, and DIC4.

For example, the current temperature profile CTP1 of the first measurement pixel row may be a temperature profile corresponding to the load ratio LR of each of the driving chips DIC1, DIC2, DIC3, and DIC4 between the maximum load temperature profile MAXLTP of the first measurement pixel row and the minimum load temperature profile MINLTP of the first measurement pixel row.

For example, as shown in FIG. 10, when the load ratio LR of the first to fourth driving chips DIC1, DIC2, DIC3, and DIC4 is 50%, the current temperature profile CTP1 of the first measurement pixel row may represent a temperature increment corresponding to 50% between the maximum load temperature profile MAXLTP of the first measurement pixel row and the minimum load temperature profile MINLTP of the first measurement pixel row.

For example, as shown in FIG. 11, when the load ratio LR of the first and fourth driving chips DIC1 and DIC4 is 25%, the current temperature profile CTP1 of the first measurement pixel row in the 1st to 2160th channels (CH[1], . . . , CH[2160]) and the 6481st to 8640th channels (CH[6481], . . . , CH[8640]) may represent a temperature increment corresponding to 25% between the maximum load temperature profile MAXLTP of the first measurement pixel row and the minimum load temperature profile MINLTP of the first measurement pixel row. For example, as shown in FIG. 11, when the load ratio LR of the second and third driving chips DIC2 and DIC3 is 50%, the current temperature profile CTP1 of the first measurement pixel row in the 2161st to 6480th channels (CH[2161], . . . , CH[6480]) may represent a temperature increment corresponding to 50% between the maximum load temperature profile MAXLTP of the first measurement pixel row and the minimum load temperature profile MINLTP of the first measurement pixel row.

Referring to FIGS. 4, 6, and 13 to 15, the one-dimensional temperature profile generator 230 may generate the current temperature profile CTP2 of the second measurement pixel row based on the maximum load temperature profile MAXLTP of the second measurement pixel row, the minimum load temperature profile MINLTP of the second measurement pixel row, and the load ratio LR of each of the driving chips DIC1, DIC2, DIC3, and DIC4.

For example, the current temperature profile CTP2 of the second measurement pixel row may be a temperature profile corresponding to the load ratio LR of each of the driving chips DIC1, DIC2, DIC3, and DIC4 between the maximum load temperature profile MAXLTP of the second measurement pixel row and the minimum load temperature profile MINLTP of the second measurement pixel row.

For example, as shown in FIG. 14, when the load ratio LR of the first to fourth driving chips DIC1, DIC2, DIC3, and DIC4 is 50%, the current temperature profile CTP2 of the second measurement pixel row may represent a temperature increment corresponding to 50% between the maximum load temperature profile MAXLTP of the second measurement pixel row and the minimum load temperature profile MINLTP of the second measurement pixel row.

For example, as shown in FIG. 15, when the load ratio LR of the first and fourth driving chips DIC1 and DIC4 is 25%, the current temperature profile CTP2 of the second measurement pixel row in the 1st to 2160th channels (CH[1], . . . , CH[2160]) and the 6481st to 8640th channels (CH[6481], . . . , CH[8640]) may represent a temperature increment corresponding to 25% between the maximum load temperature profile MAXLTP of the second measurement pixel row and the minimum load temperature profile MINLTP of the second measurement pixel row. For example, as shown in FIG. 15, when the load ratio LR of the second and third driving chips DIC2 and DIC3 is 50%, the current temperature profile CTP2 of the second measurement pixel row in the 2161st to 6480th channels (CH[2161], . . . , CH[6480]) may represent a temperature increment corresponding to 50% between the maximum load temperature profile MAXLTP of the second measurement pixel row and the minimum load temperature profile MINLTP of the second measurement pixel row.

In an embodiment, the first measurement pixel row is a pixel row adjacent or closest to the driving chips DIC1, DIC2, DIC3, and DIC4. For example, the first measurement pixel row may be a first pixel row PR[1].

The first pixel row PR[1] may be a pixel row most affected by heat generated by the driving chips DIC1, DIC2, DIC3, and DIC4. Accordingly, by generating a temperature profile for the first pixel row PR[1] and pixel rows other than the first pixel row PR[1] (i.e., the second measurement pixel row), a temperature profile appropriately reflecting an effect of heat generated by the driving chips DIC1, DIC2, DIC3, and DIC4 may be generated.

Figure 16:
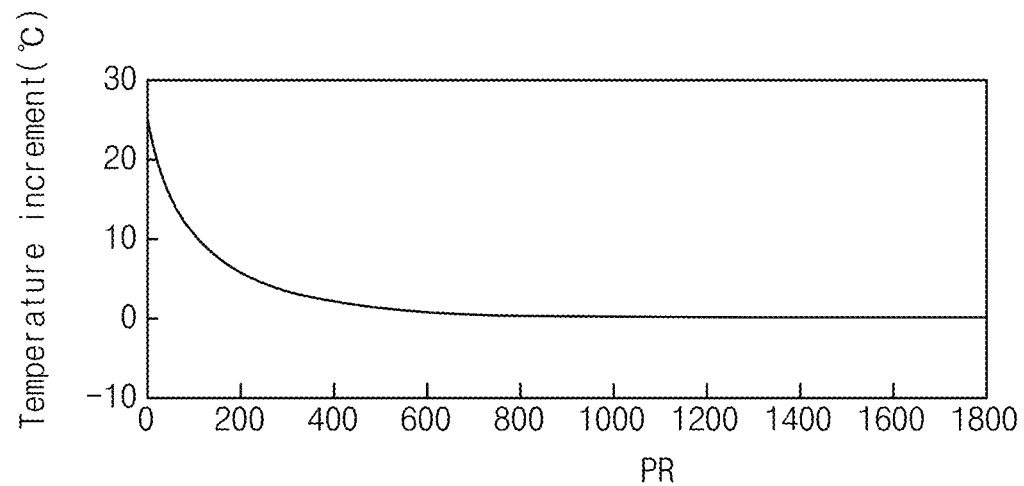
FIG. 16 is a graph showing an example of a temperature profile of a measurement sub-pixel column of FIG. 6.
Figure 17:
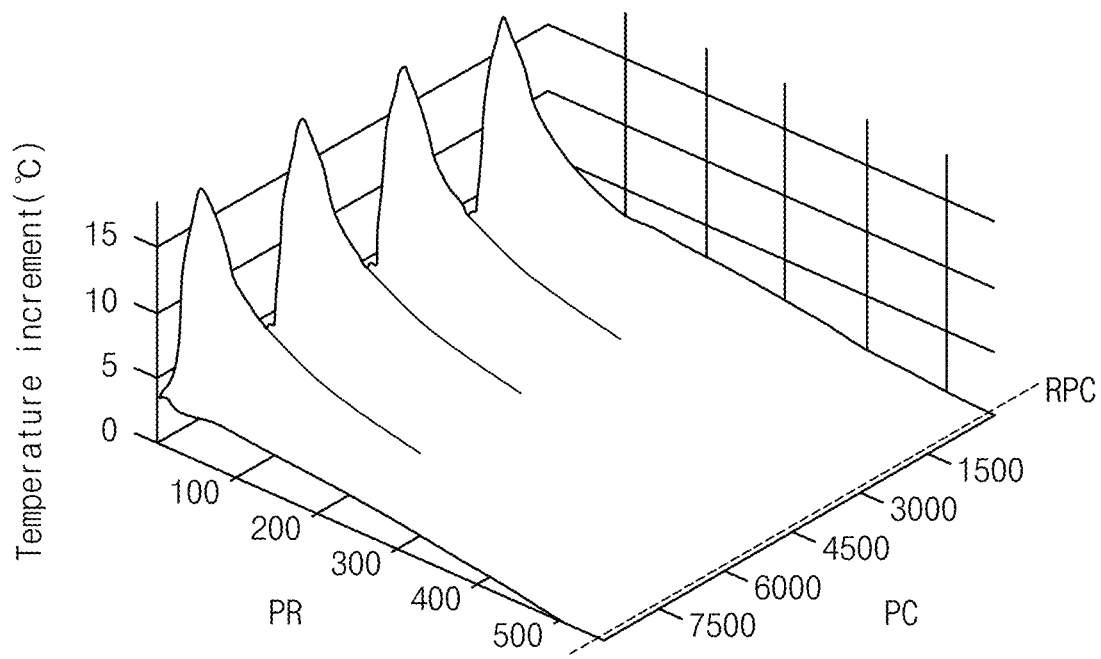
FIG. 17 is a graph showing an example of a two-dimensional temperature profile of FIG. 6.

FIG. 16 is a graph showing an example of a temperature profile PCTP of a measurement sub-pixel column of FIG. 6, and FIG. 17 is a graph showing an example of a two-dimensional temperature profile DTP of FIG. 6.

A x-axis of FIG. 16 represents a pixel row PR, and a y-axis represents a temperature increment, and the unit of the temperature increment is Celsius ° C.

FIG. 17 represents the two-dimensional temperature profile DTP based on the current temperature profile CTP1 of the first measurement pixel row of FIG. 10, the current temperature profile CTP2 of the second measurement pixel row of FIG. 14, and the temperature profile PCTP of the measurement sub-pixel column of FIG. 16.

Referring to FIGS. 4, 6, 16, and 17, the one-dimensional temperature profile generator 230 may receive a temperature profile PCTP of the measurement sub-pixel column in the form of the look-up table. The one-dimensional temperature profile generator 230 may output the temperature profile PCTP of the measurement sub-pixel row to the two-dimensional temperature profile generator 240.

In an embodiment, the temperature profile PCTP of the measurement sub-pixel column is a temperature profile when the driving chips DIC1, DIC2, DIC3, and DIC4 display the maximum load pattern. That is, the temperature profile PCTP of the measurement sub-pixel column may represent a temperature increment when the driving chips DIC1, DIC2, DIC3, and DIC4 display the maximum load pattern. For example, the temperature profile PCTP of the measurement sub-pixel column may represent the temperature increment at the measurement sub-pixel column when the driving chips DIC1, DIC2, DIC3, and DIC4 display the maximum load pattern.

The two-dimensional temperature profile generator 240 may generate the two-dimensional temperature profile DTP based on the current temperature profile CTP1 of the first measurement pixel row, and the current temperature profile CTP2 of the second measurement pixel row and the temperature profile PCTP of the measurement sub-pixel column.

The two-dimensional temperature profile DTP may be generated by summing the current temperature profile CTP1 of the first measurement pixel row, the current temperature profile CTP2 of the second measurement pixel row and the temperature profile PCTP of the measurement sub-pixel column. That is, the measurement sub-pixel column may be a sub-pixel column serving as a reference for generating a two-dimensional temperature profile DTP. For example, in the two-dimensional temperature profile DTP, a change of the temperature increment in each of the sub-pixel columns may follow a trend of the temperature profile PCTP of the measurement sub-pixel column.

For example, as shown in FIG. 17, the temperature increment in all sub-pixel columns PC may follow the trend of the temperature profile PCTP of the measurement sub-pixel column. And, the temperature increment of the pixel rows PR except for the first measurement pixel row and the second measurement pixel row may be determined by interpolating the current temperature profile CTP1 of the first measurement pixel row and the current temperature profile CTP2 of the second measurement pixel row.

The two-dimensional temperature profile DTP may include a temperature increment from a pixel row adjacent (i.e., the first pixel row PR[1]) to the driving chips DIC1, DIC2, DIC3, and DIC4 to a predetermined reference pixel row RPC. For example, the temperature increment of the first pixel row may indicate a temperature difference between the predetermined reference pixel row RPC and the first pixel row. The heat generation of the driving chips DIC1, DIC2, DIC3, and DIC4 may not affect pixel rows PR far from the driving chips DIC1, DIC2, DIC3, and DIC4 (e.g., pixel rows PR beyond the reference pixel row RPC). Accordingly, the two-dimensional temperature profile generator 240 may generate a two-dimensional temperature profile DTP from the first pixel row PR[1] to the reference pixel row RPC. The reference pixel row RPC may be experimentally determined or predefined.

In an embodiment, the two-dimensional temperature profile DTP may be referenced to determine a temperature increment of the each of the pixels up to the reference pixel row RPC. When the temperature increment of a given pixel above 0, it may indicate a number of degrees above room temperature. Damage to the given pixel may occur when the temperature increment of the given pixel is above a first threshold or above a second threshold for longer than a certain time period. The second threshold may differ from the first threshold. For example, the second threshold may be lower than the first threshold. The display device of FIG. 1 may store information for each pixel indicating whether damage is likely to occur based on the two-dimensional temperature profile DTP. The display device may present the information or use the information to prevent damage to one or more pixels. For example, if one or more of the pixels are determined to have a temperature increment higher than a certain threshold, the timing controller 200 may output control signals (e.g., CONT1-CONT3) designed to prevent the display panel 100 from displaying an image or turn off the display panel 100. In an embodiment, the display panel 100 reduces an intensity of a given pixel having a temperature increment higher than the certain threshold. For example, the timing controller 200 may set the control signal CONT2 to inform the data driver 400 of a given pixel having a temperature increment higher than the certain threshold so that the data driver 400 can prevent a voltage level of a data voltage for the given pixel from reaching a certain voltage level. For example, even though the data driver 400 had intended to output a data voltage to the given pixel at or higher than the certain voltage level, the data driver 400 may output the data voltage at a level lower than the certain voltage level. In the future, when the temperature increment of the given pixel reduces to the certain threshold or lower, the timing controller 200 may set the control signal CONT2 to inform the data driver 400 that the given pixel need not have its data voltage reduced or limited.

Figure 18:
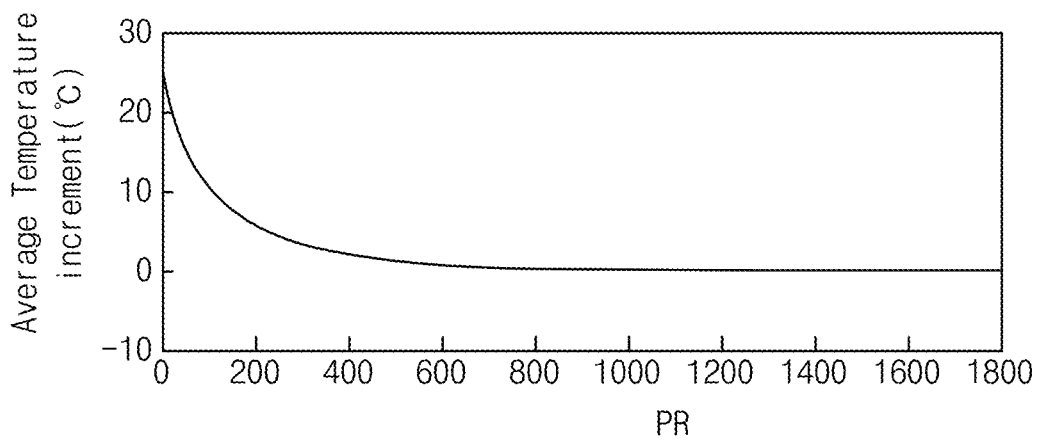
FIG. 18 is a graph showing an average temperature profile of a display device according to an embodiment of the present inventive concept.

FIG. 18 is a graph showing an average temperature profile of a display device according to an embodiment of the present inventive concept.

A display device according to the present embodiment is substantially the same as the display device of FIG. 1 except for using the average temperature profile instead of the temperature profile of the measurement sub-pixel column. Thus, the same reference numerals are used to refer to the same or similar elements, and any repetitive explanation will be omitted.

Referring to FIGS. 1 and 18, the timing controller 200 may generate the two-dimensional temperature profile DTP based on the current temperature profile CTP1 of the first measurement pixel row, the current temperature profile CTP2 of the second measurement pixel row and the average temperature profile of the temperature profiles PCTP of the sub-pixel columns.

That is, the display device of FIG. 1 may generate the two-dimensional temperature profile DTP based on a temperature profile (PCTP in FIG. 6) of a selected sub-pixel column (i.e., the measurement sub-pixel column). On the other hand, the display device of FIG. 18 may generate the two-dimensional temperature profile DTP based on the average temperature profile of temperature profiles of all sub-pixel columns or some sub-pixel columns.

Figure 19:
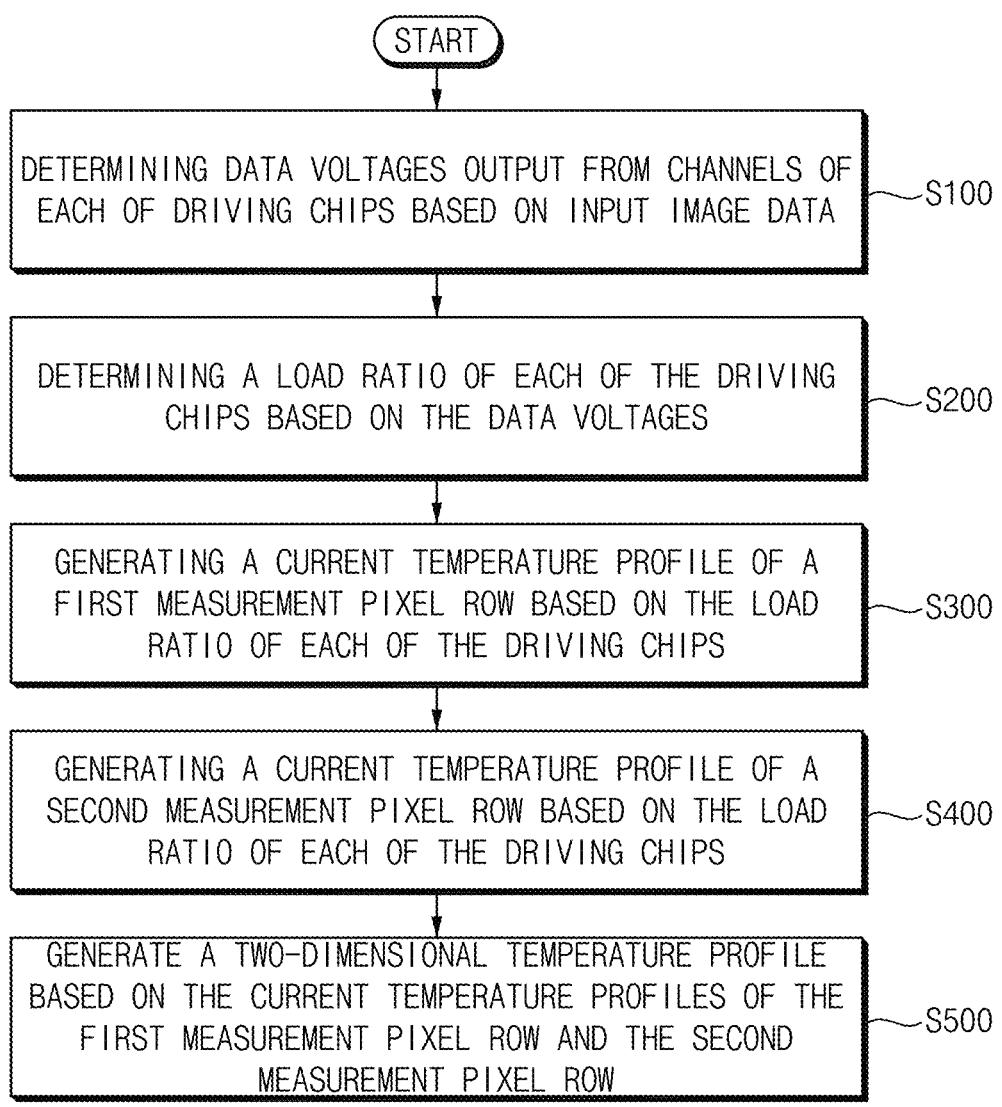
FIG. 19 is a flowchart illustrating a method of generating a temperature profile of a display device according to an embodiment of the present inventive concept.

FIG. 19 is a flowchart illustrating a method of generating a temperature profile of a display device according to an embodiment of the present inventive concept.

Referring to FIG. 19, the method of FIG. 19 includes determining data voltages output from channels of each of driving chips based on input image data (S100), determining a load ratio of each of the driving chips based on the data voltages (S200), generating a current temperature profile of a first measurement pixel row based on the load ratio of each of the driving chips (S300), generating a current temperature profile of a second measurement pixel row based on the load ratio of each of the driving chips (S400), and generate a two-dimensional temperature profile based on the current temperature profiles of the first measurement pixel row and the second measurement pixel row (S500).

Specifically, the method of FIG. 19 may include determining the data voltages output from the channels of each of the driving chips based on the input image data (S100). In an embodiment, the data voltages may be determined using a grayscale-voltage lookup table including the data voltages corresponding to the grayscale values. In another embodiment, the data voltages may be determined using grayscale-voltage lookup tables for the driving chips including the data voltages corresponding to the grayscale values. For example, the grayscale-voltage lookup tables for the driving chips may differ from one another.

Specifically, the method of FIG. 19 may include determining the load ratio of each of the driving chips based on the data voltages (S200). For example, the load ratio of each of the driving chips may be determined based on the differences in the data voltages between adjacent pixel rows in each of the channels. The load ratio of each of the driving chips may be determined by summing the differences in the data voltages between the adjacent pixel rows in each of the channels to calculate loads of the channels, summing channel loads of each of the driving chips to calculate a chip load of each of the driving chips, and dividing the chip load of each of the driving chips by the maximum chip load.

Specifically, the method of FIG. 19 may include generating the current temperature profile of the first measurement pixel row based on the load ratio of each of the driving chips (S300) and generating the current temperature profile of the second measurement pixel row based on the load ratio of each of the driving chips (S400). The current temperature profiles of the first measurement pixel row and the second measurement pixel row may be generated based on the maximum load temperature profile and the minimum load temperature profile.

For example, the current temperature profile of the first measurement pixel row may be generated based on the maximum load temperature profile of the first measurement pixel row, the minimum load temperature profile of the first measurement pixel row, and the load ratio of each of the driving chips. For example, the current temperature profile of the first measurement pixel row may be a temperature profile corresponding to the load ratio of each of the driving chips between the maximum load temperature profile of the first measurement pixel row and the minimum load temperature profile of the first measurement pixel row.

For example, the current temperature profile of the second measurement pixel row may be generated based on the maximum load temperature profile of the second measurement pixel row, the minimum load temperature profile of the second measurement pixel row, and the load ratio of each of the driving chips. For example, the current temperature profile of the second measurement pixel row may be a temperature profile corresponding to the load ratio of each of the driving chips between the maximum load temperature profile of the second measurement pixel row and the minimum load temperature profile of the second measurement pixel row.

Specifically, the method of FIG. 19 may include generate the two-dimensional temperature profile based on the current temperature profiles of the first measurement pixel row and the second measurement pixel row (S500). In an embodiment, the two-dimensional temperature profile is generated based on the current temperature profile of the first measurement pixel row, the current temperature profile of the second measurement pixel row and the temperature profile of the measurement sub-pixel column. Since generation of the two-dimensional temperature profile has been described with reference to FIGS. 1 to 18, overlapping description thereof will be omitted.

Figure 20:
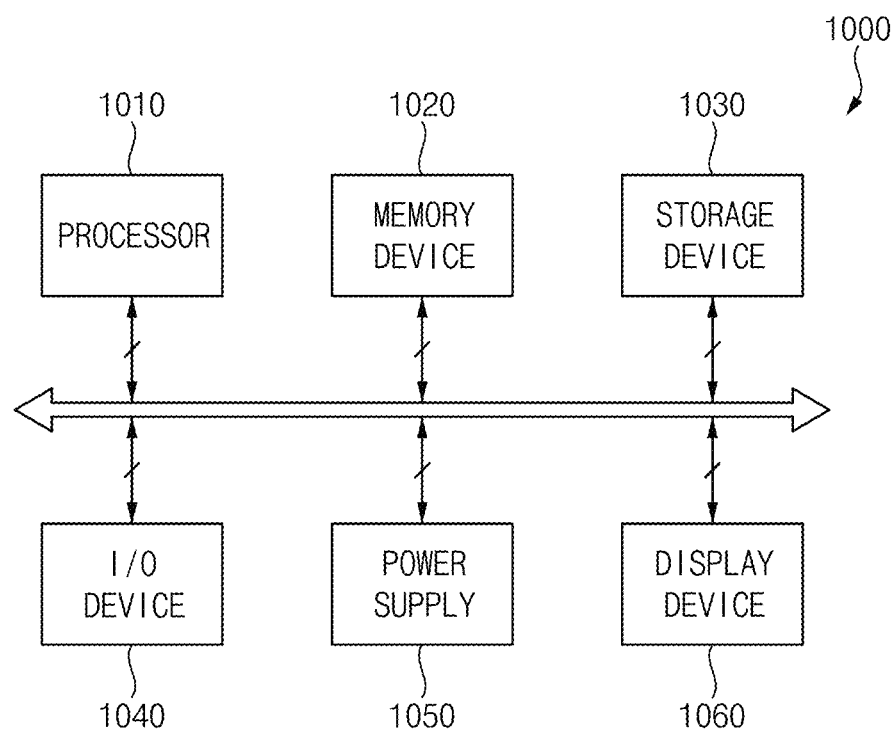
FIG. 20 is a block diagram showing an electronic device according to an embodiment of the present inventive concept.
Figure 21:
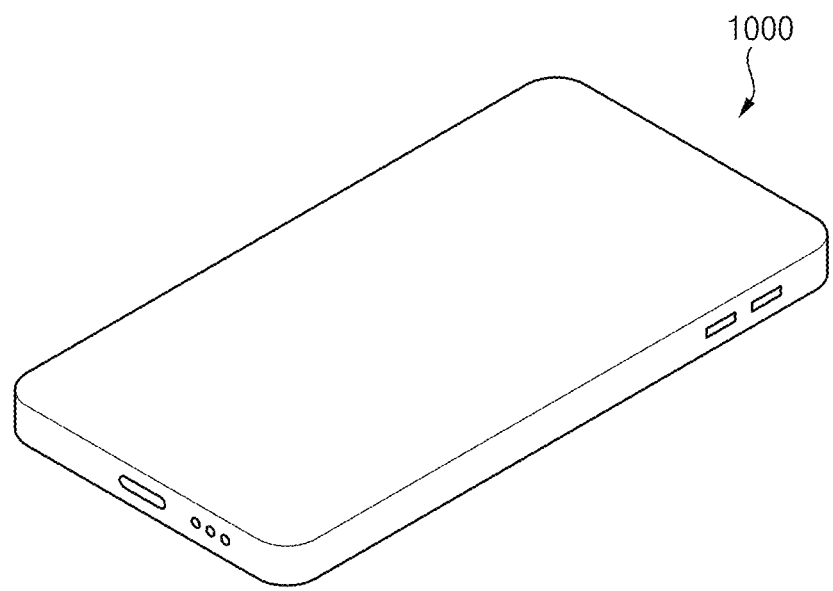
FIG. 21 is a diagram showing an example in which the electronic device of FIG. 20 is implemented as a smart phone.

FIG. 20 is a block diagram showing an electronic device according to embodiment of the present inventive concept, and FIG. 21 is a diagram showing an example in which the electronic device of FIG. 20 is implemented as a smart phone.

Referring to FIGS. 20 and 21, the electronic device 1000 may include a processor 1010, a memory device 1020, a storage device 1030, an input/output (I/O) device 1040, a power supply 1050, and a display device 1060. Here, the display device 1060 may be the display device of FIG. 1. In addition, the electronic device 1000 may further include a plurality of ports for communicating with a video card, a sound card, a memory card, a universal serial bus (USB) device, other electronic devices, etc. In an embodiment, as shown in FIG. 21, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, etc.

The processor 1010 may perform various computing functions. The processor 1010 may be a micro processor, a central processing unit (CPU), an application processor (AP), etc. The processor 1010 may be coupled to other components via an address bus, a control bus, a data bus, etc. Further, the processor 1010 may be coupled to an extended bus such as a peripheral component interconnection (PCI) bus.

The memory device 1020 may store data for operations of the electronic device 1000. For example, the memory device 1020 may include at least one nonvolatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. and/or at least one volatile memory device such as a dynamic random access memory (DRAM) device, a static random access memory (SRAM) device, a mobile DRAM device, etc.

The storage device 1030 may include a solid state drive (SSD) device, a hard disk drive (HDD) device, a CD-ROM device, etc.

The I/O device 1040 may include an input device such as a keyboard, a keypad, a mouse device, a touch pad, a touch screen, etc., and an output device such as a printer, a speaker, etc. In some embodiments, the I/O device 1040 may include the display device 1060.

The power supply 1050 may provide power for operations of the electronic device 1000. For example, the power supply 1050 may be a power management integrated circuit (PMIC).

The display device 1060 may display an image corresponding to visual information of the electronic device 1000. For example, the display device 1060 may be an organic light emitting display device or a quantum dot light emitting display device, but is not limited thereto. The display device 1060 may be coupled to other components via the buses or other communication links. Here, the display device 1060 may predict and model an effect of a heat generated by the driving chips.

The inventive concepts may be applied to any electronic device including the display device. For example, the inventive concepts may be applied to a television (TV), a digital TV, a 3D TV, a mobile phone, a smart phone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, etc.

The foregoing is illustrative of the present inventive concept and is not to be construed as limiting thereof. Although a few exemplary embodiments of the present inventive concept have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific exemplary embodiments disclosed, and that modifications to the disclosed exemplary embodiments, as well as other exemplary embodiments, are intended to be included within the scope of the appended claims.

What is claimed is:

1. An electronic device comprising:
    a display device configured to display an image on a display panel; and
    a processor configured to perform computing functions for the display device,
    wherein the display device includes:
        the display panel including a plurality of pixels;
        a plurality of driving chips configured to apply data voltages to the pixels through channels; and
        a timing controller configured to generate a current temperature profile of a first pixel row of the pixels based on a load ratio of each of the driving chips, generate a current temperature profile of a second pixel row of the pixels based on the load ratio of each of the driving chips, and generate a two-dimensional temperature profile based on the current temperature profiles of the first pixel row and the second pixel row.

2. The electronic device of claim 1, wherein the two-dimensional temperature profile is used to model an effect of heat generated by the driving chips on a temperature of the display panel.

3. The electronic device of claim 1, wherein the timing controller includes:
    a voltage determiner configured to determine the data voltages output from the channels by each of the driving chips based on the input image data;
    a load calculator configured to determine the load ratio of each of the driving chips based on the data voltages;
    a one-dimensional temperature profile generator configured to generate a current temperature profile of a first pixel row of the pixels based on the load ratio of each of the driving chips and to generate a current temperature profile of a second pixel row of the pixels based on the load ratio of each of the driving chips; and
    a two-dimensional temperature profile generator configured to generate the two-dimensional temperature profile based on the current temperature profiles of the first pixel row and the second pixel row.

4. The electronic device of claim 3, wherein the voltage determiner is configured to determine the data voltages using a grayscale-voltage lookup table including the data voltages corresponding to grayscale values.

5. The electronic device of claim 3, wherein the voltage determiner is configured to determine the data voltages using grayscale-voltage lookup tables for the driving chips including the data voltages corresponding to grayscale values.

6. The electronic device of claim 3, wherein the load calculator is configured to determine the load ratio of each of the driving chips based on differences in the data voltages between adjacent pixel rows in each of the channels.

7. The electronic device of claim 6, wherein the load calculator is configured to sum the differences in the data voltages between the adjacent pixel rows in each of the channels to calculate channel loads of the channels, wherein the load calculator is configured to sum the channel loads of each of the driving chips to calculate a chip load of each of the driving chips, and wherein the load calculator is configured to divide the chip load by a maximum chip load to determine the load ratio of each of the driving chips.

8. The electronic device of claim 7, wherein the maximum chip load is the chip load when a maximum load pattern is displayed on the display panel.

9. The electronic device of claim 8, wherein the maximum load pattern is a zebra pattern.

10. The electronic device of claim 3, wherein the one-dimensional temperature profile generator is configured to generate the current temperature profiles of the first pixel row and the second pixel row based on a maximum load temperature profile and a minimum load temperature profile.

11. The electronic device of claim 10, wherein the one-dimensional temperature profile generator is configured to generate the current temperature profile of the first pixel row based on the maximum load temperature profile of the first pixel row, the minimum load temperature profile of the first pixel row, and the load ratio of each of the driving chips, and wherein the one-dimensional temperature profile generator is configured to generate the current temperature profile of the second pixel row based on the maximum load temperature profile of the second pixel row, the minimum load temperature profile of the second pixel row, and the load ratio of each of the driving chips.

12. The electronic device of claim 11, wherein the current temperature profile of the first pixel row is a temperature profile corresponding to the load ratio of each of the driving chips between the maximum load temperature profile of the first pixel row and the minimum load temperature profile of the first pixel row, and wherein the current temperature profile of the second pixel row is a temperature profile corresponding to the load ratio of each of the driving chips between the maximum load temperature profile of the second pixel row and the minimum load temperature profile of the second pixel row.

13. The electronic device of claim 10, wherein the maximum load temperature profile is a temperature profile when the driving chips display a maximum load pattern.

14. The electronic device of claim 10, wherein the minimum load temperature profile is a temperature profile when the driving chips display a minimum load pattern.

15. The electronic device of claim 14, wherein the minimum load pattern is a monochromatic pattern.

16. The electronic device of claim 3, wherein the two-dimensional temperature profile generator is configured to generate the two-dimensional temperature profile based on the current temperature profiles of the first pixel row and the second pixel row and a temperature profile of a column of sub-pixels of the display panel.

17. The electronic device of claim 16, wherein the two-dimensional temperature profile is generated by summing the current temperature profiles of the first pixel row and the second pixel row and the temperature profile of the column.

18. The electronic device of claim 3, wherein the two-dimensional temperature profile generator is configured to generate the two-dimensional temperature profile based on the current temperature profiles of the first pixel row and the second pixel row and an average temperature profile of temperature profiles of columns of sub-pixels of the display panel.

19. The electronic device of claim 3, wherein the two-dimensional temperature profile includes a temperature increment from a pixel row adjacent to the driving chips to a predetermined reference pixel row.

20. The electronic device of claim 3, wherein the first pixel row is a pixel row adjacent to the driving chips.

* * * * *